W. W. SALMON.
RAILWAY SIGNAL.
APPLICATION FILED JUNE 3, 1909.
934,631.
Patented Sept. 21, 1909.
3 SHEETS—SHEET 1.
FIG.1.
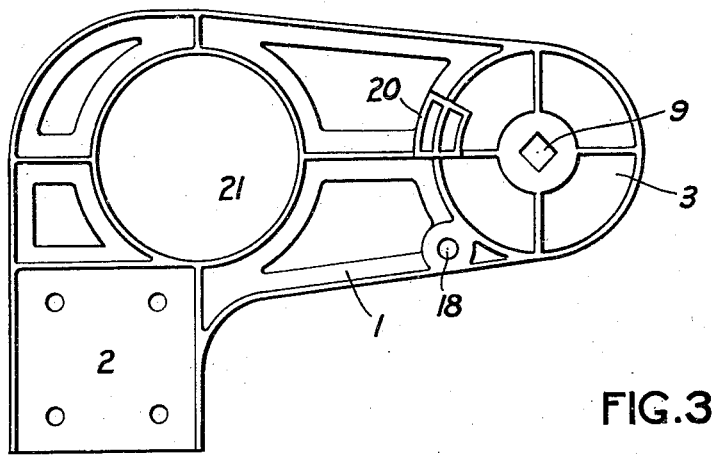
FIG.3.
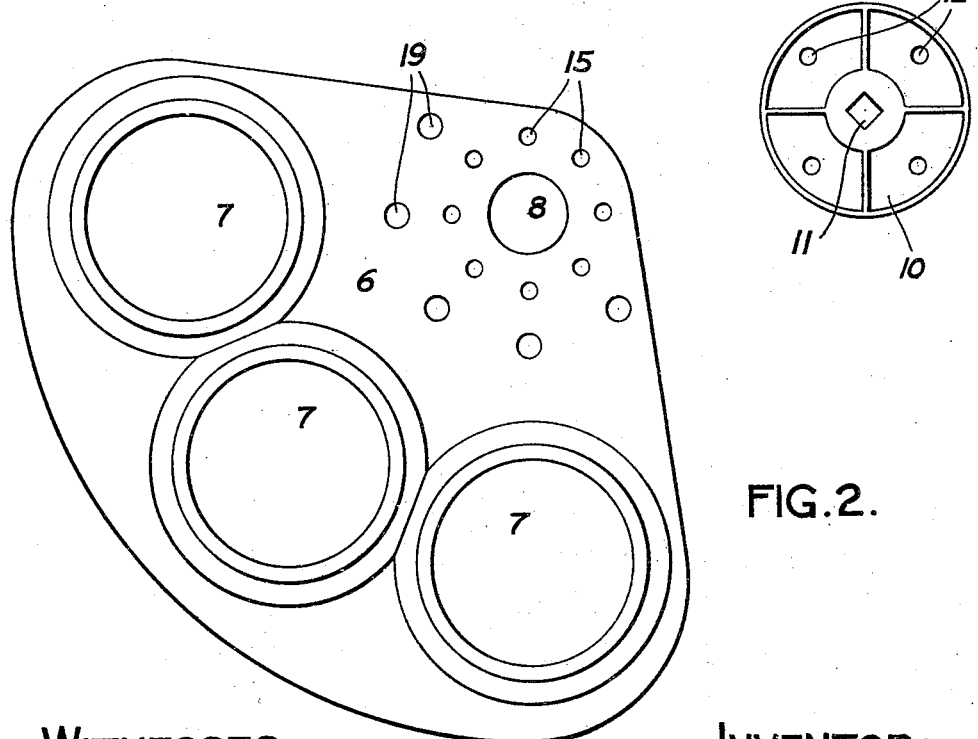
FIG.2.
WITNESSES:
C. W. Carroll
L. Thon
INVENTOR:
Wilmer W. Salmon
by Osgood & Davis
his attorneys

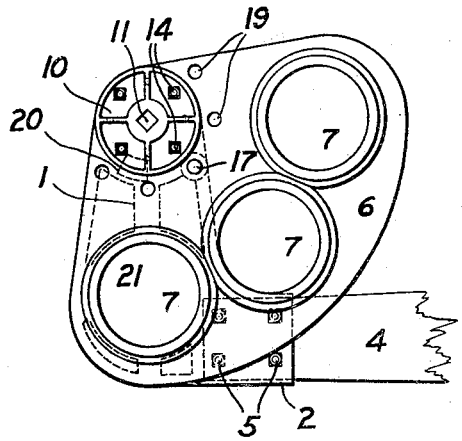
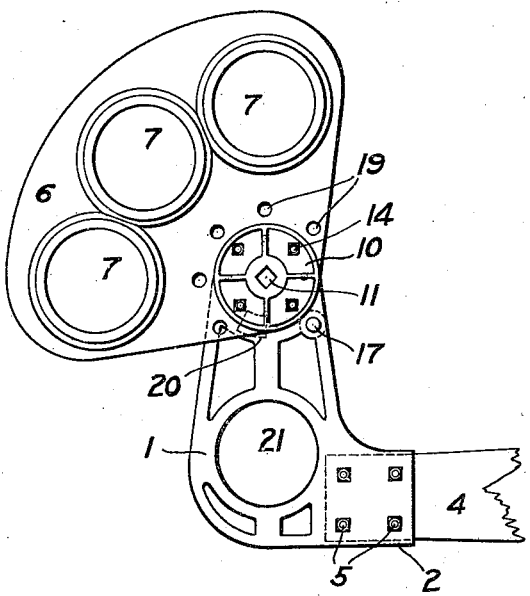
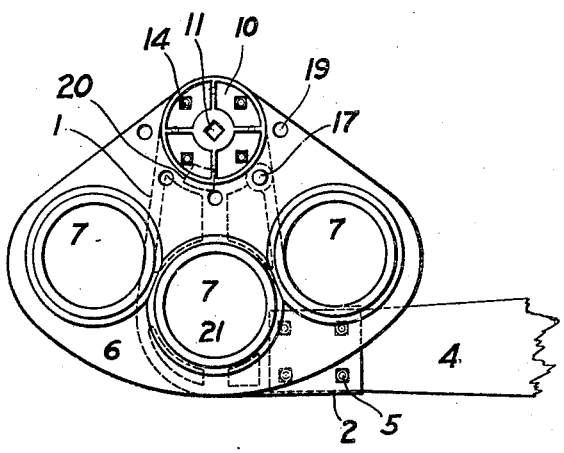
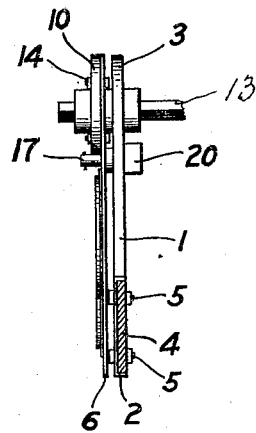

W. W. SALMON.
RAILWAY SIGNAL.
APPLICATION FILED JUNE 3, 1909.

934,631.

Patented Sept. 21, 1909.
3 SHEETS—SHEET 3.

WITNESSES:
C. W. Carroll
L. Thon

INVENTOR:
Wilmer W. Salmon
by Osgood & Davis
his attorneys

UNITED STATES PATENT OFFICE.

WILMER W. SALMON, OF ROCHESTER, NEW YORK, ASSIGNOR TO GENERAL RAILWAY SIGNAL COMPANY, OF GATES, NEW YORK, A CORPORATION OF NEW YORK.

RAILWAY-SIGNAL.

934,631.  Specification of Letters Patent.  Patented Sept. 21, 1909.

Application filed June 3, 1909.  Serial No. 499,994.

*To all whom it may concern:*

Be it known that I, WILMER W. SALMON, a citizen of the United States, and resident of Rochester, in the county of Monroe and State of New York, have invented certain new and useful Improvements in Railway-Signals, of which the following is a specification.

This invention relates to railway signals. One object of the invention is to provide a semaphore and spectacles for a signal lamp, that rotate together around the same axis, and are adjustable with reference to each other.

Another object of the invention is a construction whereby the semaphore and spectacles are independently supported, so that if the semaphore breaks, the spectacles will still be operative, and if the spectacle breaks, the semaphore will still be operative.

These and other improvements will be described in the following specification and claims.

Figure 8:
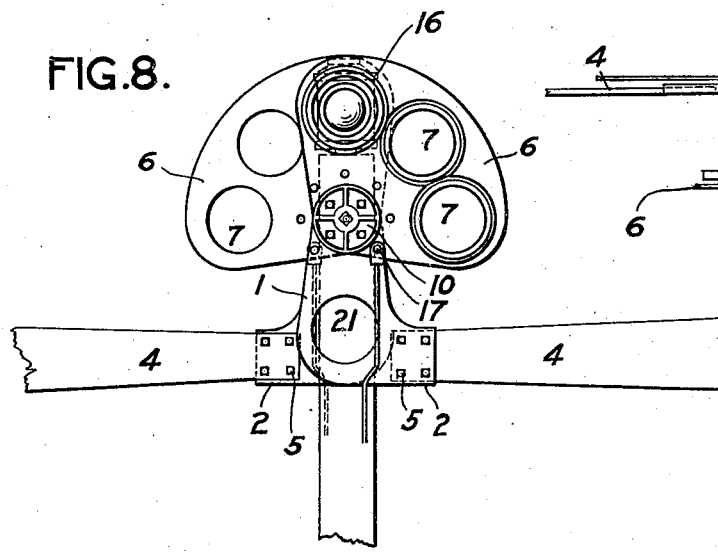
Figure 9:
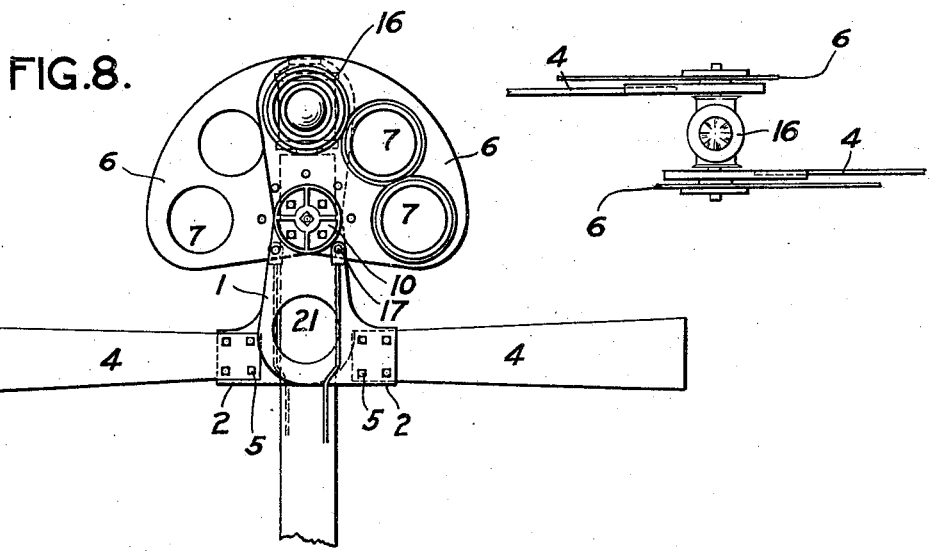
Figure 10:
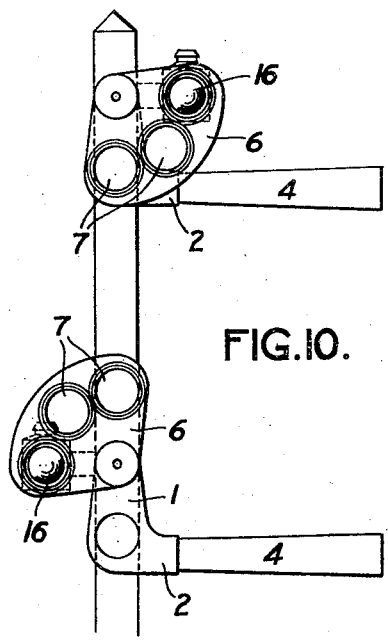

In the drawings:—Figure 1 is a side view of the casting or frame to which the blade and spectacles are attached; Figs. 2 and 3 show, respectively, the spectacles and the plate whereby the spectacles are secured to the operating shaft; Figs. 4—7, inclusive, show in detail several different positions in which it is possible to secure the spectacles to the plate, for different locations of the lamp, Fig. 7 being an end view, from the right of Fig. 6; and Figs. 8—10, inclusive, show the semaphore and lamp mounted in different positions upon the support, and their relative positions when some of the adjustments illustrated in Figs. 4—7, inclusive, are used, Fig. 8 showing two oppositely directed semaphores in position, Fig. 9 being a plan view of Fig. 8, and Fig. 10 showing the adjustments of Figs. 4 and 5 for staggered lights.

1 is a casting or frame that has at one end a grip 2 for the semaphore blade, and at the other end 3 is adapted to be attached to its support. The usual blade 4 is attached to the casting by any suitable means, as by bolts 5, but the spectacles 6 are adjustable and so proportioned with reference to the signaling positions of the semaphore that when set correctly for the lamp in one signaling position, the other openings will show the light at its other signaling positions. To this end the spectacles 6 (Fig. 2) consist of a frame or plate that has several openings 7, according to the number of signaling positions which the semaphore is to have, and these are arranged in an arc whose center 8 coincides with the pivotal center 9 of the semaphore (Fig. 1) when the spectacles are in position. The invention is illustrated in the drawings by spectacles that are adapted to operate in a single quadrant, and have three equidistant openings.

The spectacles are not attached directly to the semaphore, but both are revolubly secured to the operating shaft 13, so that the semaphore and spectacles revolve together around the same axis. A hub 9 on the end 3 of the semaphore casting or frame fits nonrevolubly upon the shaft 13, as shown in Fig. 7, and a plate 10 that also fits nonrevolubly upon the shaft 13, as indicated by 11 in Fig. 3, carries the spectacles. The spectacles are secured to the plate 10 by bolts 14, which pass through holes 12 in the plate and holes 15 in the spectacles. Four holes 12 are shown, and they are, respectively, represented as equidistant from each other and also equidistant from the pivotal center of the semaphore, so that a hole is centrally located in each quadrant of the plate 10. Eight holes 15 are shown around the center 8 of the spectacles, which are equidistant from each other, and at the same radial distance from the center as the holes 12. Accordingly, the spectacles can be set around the pivotal center of the semaphore at angular distances apart of forty-five degrees. And since the three openings 7 in the spectacles are angularly forty-five degrees apart, it is possible to accommodate the spectacles to any one of the eight possible positions in which the signal lamp 16 may be placed upon the post or support with reference to the semaphore blade. While semaphore and spectacles must work in unison, they are independent signals, and this invention makes it possible to preserve their independence and at the same time operate them together around the same pivotal axis. Thus, the advantages of spectacles located at the semaphore are obtained, and at the same time the spectacles are not disabled by breaking the semaphore. The stud 17 by which the operating crank and rod (not shown) are attached to the semaphore is riveted in the hole 18 in the frame 1, and passes through one of the enlarged holes 19 in the spectacles, according to their position on the frame 1, and a stop 20 is shown on the frame 1 that is adapted to engage a suitable stationary stop on the signal post (not shown).

Referring to the different positions in which the spectacles are shown on the semaphore, it will be observed that the adjustment shown in Fig. 4 is adapted for a semaphore that operates in the upper quadrant in connection with a lamp located on the same side of the signal post that the blade is on. This is illustrated by the upper signal of Fig. 10.

In Fig. 5 another adjustment of the spectacles is shown, which is adapted for signaling in the upper quadrant in connection with a lamp located on the opposite side of the signal post from the blade, as illustrated by the lower signal of Fig. 10, while Figs. 6 and 8 show the relative positions of the spectacles and blade when the lamp is in still other positions or the signaling is to be done in some other quadrant. Obviously the spectacles are adapted for use in connection with a semaphore that operates in any quadrant, and can itself be set to operate in any quadrant, regardless of the quadrant in which the semaphore operates.

It will have been observed that there are positions of the spectacles in which the semaphore casting or frame 1 is interposed between the spectacles and the lamp, as, for example, the adjustments represented in Figs. 4 and 6. In order that the frame 1 may not obscure the light, an opening 21 is provided in it, that has the same radial distance from the pivotal center of the semaphore that the openings 7 in the spectacles have, when in place. When the spectacles are to be used in permanent adjustment in one of the upper quadrants, the opening 21 may be used to receive a weight or counterbalance.

An adjustable semaphore of this description is obviously adapted to a wide range of requirements, and can be made and held in stock, ready to be assembled for any system of signaling.

What I claim is:—

1. The combination with a semaphore, of spectacles for a signal lamp adapted to operate therewith around the same center; and means for setting the spectacles for a lamp located in any quadrant desired; substantially as shown and described.

2. The combination with a semaphore adapted for signaling in any quadrant desired, of spectacles for a signal lamp adapted to operate therewith around the same center, and also adapted to be set for a signal lamp in any quadrant desired; substantially as shown and described.

3. A semaphore having spectacles that are adjustable around the pivotal axis of the semaphore; substantially as shown and described.

4. The combination with a semaphore, of spectacles for a signal lamp adapted to rotate therewith around the same pivotal center; and means for adjustably connecting the spectacles and semaphore; substantially as shown and described.

5. The combination with an angular semaphore pivotally supported at one end, of spectacles connected with the semaphore and adjustable around its pivotal axis; substantially as shown and described.

6. The combination with a semaphore, of spectacles for a signal lamp, having a plurality of openings arranged in an arc; and means for adjustably connecting the spectacles and the semaphore; with the center of said arc coincident with the pivotal axis of the semaphore; substantially as shown and described.

7. The combination with a semaphore, of spectacles for a signal lamp, having a plurality of equidistant openings arranged in an arc; and means for adjustably connecting the spectacles and semaphore, with the center of said arc coincident with the pivotal axis of the semaphore; substantially as shown and described.

8. The combination with a semaphore, of spectacles for a signal lamp, having equidistant openings arranged in an arc; means for connecting the spectacles and semaphore, so that the center of said arc is coincident with the pivotal axis of the semaphore, in various equidistant positions around said axis, that are angularly the same distance apart as the openings in the spectacles; substantially as shown and described.

9. The combination with an L-shaped semaphore pivotally supported at one end, of spectacles having a plurality of openings arranged in an arc; and means for adjustably connecting the spectacles and semaphore with the center of said arc coincident with the pivotal axis of the semaphore; substantially as shown and described.

10. The combination of a semaphore and spectacles for a signal lamp, both attached to the same operating shaft, but independently of each other; and means for adjusting the spectacles around the shaft with reference to the semaphore blade; substantially as shown and described.

11. The combination of a semaphore and a spectacle-support, attached to the same operating shaft; spectacles; and adjustable means for attaching the spectacles to their support; substantially as shown and described.

12. The combination of a semaphore and a spectacles-support, attached to the same operating shaft; spectacles having a plurality of equidistant openings; and means for attaching the spectacles to their support at various positions separated by the same distance as that between said openings; substantially as shown and described.

13. The combination of an angular semaphore frame adapted to carry a blade at one end, and to be attached to its support at its other end, and having an intermediate opening to display a signal lamp, with spectacles adjustably supported at the pivotal axis of the semaphore and having a plurality of openings at the same radial distance from the pivotal axis as the said opening in the semaphore frame; substantially as shown and described.

WILMER W. SALMON.

Witnesses:
F. L. DODGSON,
S. C. SARGENT.